(12) United States Patent
Ghyme

(10) Patent No.: US 10,839,540 B2
(45) Date of Patent: Nov. 17, 2020

(54) APPARATUS AND METHOD FOR GENERATING INTERMEDIATE VIEW IMAGE

(71) Applicant: ELECTRONICS AND TELECOMMUNICATIONS RESEARCH INSTITUTE, Daejeon (KR)

(72) Inventor: Sang Won Ghyme, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 153 days.

(21) Appl. No.: 16/142,614

(22) Filed: Sep. 26, 2018

(65) Prior Publication Data
US 2019/0102899 A1    Apr. 4, 2019

(30) Foreign Application Priority Data

Sep. 29, 2017  (KR) .................. 10-2017-0127776
Aug. 27, 2018  (KR) .................. 10-2018-0100685

(51) Int. Cl.
*G06T 7/593*    (2017.01)
*G06T 7/564*    (2017.01)
(Continued)

(52) U.S. Cl.
CPC .............. *G06T 7/593* (2017.01); *G06T 7/564* (2017.01); *H04N 13/111* (2018.05);
(Continued)

(58) Field of Classification Search
CPC . G06T 2207/10016; G06T 5/002; G06T 7/12; G06T 2207/10012; G06T 7/593;
(Continued)

(56) References Cited

U.S. PATENT DOCUMENTS 7,742,657 B2   6/2010  Kim et al.
9,652,819 B2   5/2017  Kim et al.
(Continued)

FOREIGN PATENT DOCUMENTS

JP          4065488 B2    3/2008
JP          2015087846 A  5/2015
(Continued)

OTHER PUBLICATIONS

Wenxiu Sun et al., "An overview of free viewpoint Depth-Image-Based Rendering (DIBR)", Proceedings of the Second APSIPA Annual Summit and Conference, pp. 1023-1030, Dec. 14-17, 2010.
(Continued)

*Primary Examiner* — Allahyar Kasraian
(74) *Attorney, Agent, or Firm* — Rabin & Berdo, P.C.

(57) ABSTRACT

Disclosed herein are an apparatus and a method for generating an intermediate view image of a stereoscopic image. The apparatus may include a feature point detector detecting contours in left and right view images and detecting feature points in the contours, a corresponding point detector detecting corresponding points corresponding to the feature points of the left and right view images, and a composer generating an intermediate view image based on disparity information between the feature points and the corresponding points.

7 Claims, 18 Drawing Sheets

(51) Int. Cl.
*H04N 13/122* (2018.01)
*H04N 13/111* (2018.01)
*H04N 13/128* (2018.01)
*H04N 13/00* (2018.01)

(52) U.S. Cl.
CPC ......... *H04N 13/122* (2018.05); *H04N 13/128* (2018.05); *G06T 2207/10012* (2013.01); *H04N 2013/0081* (2013.01)

(58) Field of Classification Search
CPC ........ G06T 9/20; H04N 13/128; H04N 5/142; H04N 5/21; H04N 2013/0081; H04N 13/122; H04N 13/271; H04N 13/275
See application file for complete search history.

(56) References Cited

U.S. PATENT DOCUMENTS

| | | | | |
|---|---|---|---|---|
| 2010/0142824 | A1* | 6/2010 | Lu | G06K 9/32 382/195 |
| 2012/0105444 | A1* | 5/2012 | Tokuda | G06T 7/97 345/419 |
| 2013/0057844 | A1 | 3/2013 | Stefanoski et al. | |
| 2013/0135439 | A1* | 5/2013 | Kakuko | H04N 13/00 348/46 |
| 2013/0278596 | A1* | 10/2013 | Wu | H04N 13/271 345/419 |
| 2014/0152658 | A1* | 6/2014 | Ahn | G06T 15/00 345/419 |
| 2016/0191895 | A1 | 6/2016 | Yun | |

FOREIGN PATENT DOCUMENTS

| | | |
|---|---|---|
| JP | 2016-009245 A | 1/2016 |
| KR | 10-0731979 B1 | 6/2007 |

OTHER PUBLICATIONS

Steven Seitz et al., "View Morphing", SIGGRAPH '96 Proceedings of the 23rd annual conference on Computer graphics and interactive techniques, pp. 21-30, Aug. 1996.

* cited by examiner

300

APPARATUS AND METHOD FOR GENERATING INTERMEDIATE VIEW IMAGE

CROSS-REFERENCE TO RELATED APPLICATION

This application claims priority to and the benefit of Korean Patent Application Nos. 10-2017-0127776 and 10-2018-0100685 filed in the Korean Intellectual Property Office on Sep. 29, 2017, and Aug. 27, 2018, respectively, the entire contents of which are incorporated herein by reference.

BACKGROUND OF THE INVENTION

(a) Field of the Invention

The present invention relates to an apparatus and a method for generating an intermediate view image of a stereoscopic image.

(b) Description of the Related Art

As a method for generating the intermediate view image, there are a method using uniform disparity information for all regions of an image, a method using disparity information for all pixels of an image, and a method using disparity information for some pixels of an image.

The method using uniform disparity information for all regions of an image is a method for specifying a rectangular area for a part or all of the left and right images, and finding a rectangular region of an intermediate image by transforming the rectangular area into three dimensions, and generating an intermediate image by image morphing from the rectangular area of the left and right images to the rectangular region of the intermediate image.

This method assumes that the disparity information is uniform over all regions of the rectangular area, so that there is a problem that it can be used only for an image without complicated changes.

The method using disparity information for all pixels of an image is a method for generating a disparity map by the disparity information for all pixels of the left and right images, and generating an intermediate image by referring to the disparity map and the left and right images.

Specifically, in this method, each of the left and right images is projected into a three-dimensional space by referring to the disparity map and combined, and then the intermediate view image is generated by being projected with each of pixel information in the three-dimensional space to a designated intermediate position of a plane in which the left and right images exist.

In this method, the intermediate view can be obtained even for a complex image, but there is a problem that the overall quality of the intermediate view depends on quality of the disparity map.

If the disparity map is incomplete, each pixel of the left and right images is projected to an incorrect position in the three-dimensional space, and then projected to the wrong position of the intermediate view plane, such that a hole is generated where the original pixel is located and the pixel value of the misprojected position is disturbed.

Since this method requires the disparity information for all the pixels of the left and right images, it takes a long time to calculate. In this method, it is easy to generate noise including incorrect disparity information, so it is difficult to obtain a high quality disparity map.

The method using disparity information for some pixels of an image has a problem that it is necessary to minimize the finding a necessary points, and an error of the disparity information obtained at each point.

SUMMARY OF THE INVENTION

An exemplary embodiment provides an apparatus for generating intermediate view images of a stereoscopic image.

Another exemplary embodiment provides a method for generating intermediate view images of a stereoscopic image.

DETAILED DESCRIPTION OF THE EMBODIMENTS

Figure 1B:
FIG. 1B is a schematic diagram illustrating a right view image.

Hereinafter, exemplary embodiments of the present disclosure will be described in detail with reference to the accompanying drawings so that those skilled in the art may easily practice the present disclosure. However, the present disclosure may be modified in various different ways and is not limited to embodiments described herein. In the accompanying drawings, portions unrelated to the description will be omitted in order to obviously describe the present disclosure, and similar reference numerals will be used to describe similar portions throughout the present specification.

Throughout the present specification and the claims, unless explicitly described to the contrary, the word "comprise" and variations such as "comprises" or "comprising" will be understood to imply the inclusion of stated elements but not the exclusion of any other elements.

A method for generating an intermediate view image between captured left and right images includes a method for obtaining disparity information between left and right images and a method for synthesizing left and right images using the disparity information.

The method for obtaining disparity information is divided into a method for obtaining disparity information in all regions of an image and a method for obtaining disparity information in some regions of an image.

Figure 1A:
FIG. 1A is a schematic diagram illustrating a left view image.
Figure 2:
FIG. 2 is a schematic diagram illustrating a disparity map acquired by a method for obtaining disparity information in all regions of an image.
Figure 3:
FIG. 3 is a schematic diagram illustrating an intermediate view image generated by the method for obtaining disparity information in all regions of an image.

FIGS. 1A and 1B are schematic diagrams illustrating a left view image (1A) and a right view image (1B). FIG. 2 is a schematic diagram illustrating a disparity map acquired by the method for obtaining disparity information in all regions of an image. FIG. 3 is a schematic diagram illustrating an intermediate view image generated by the method for obtaining disparity information in all regions of an image.

The method for obtaining disparity information in all regions of an image is a method for using all the pixels of the left and right images as feature points and detecting corresponding points corresponding to the feature points, and calculating the disparity information by using the corresponding points and the feature points.

In this method, a disparity map of the same size as the image is obtained through a stereo-matching technique.

This method takes a long time to calculate because this method calculates disparity information in all the pixels of the left and right images. In this method, since it is impossible to obtain accurate disparity values for all the pixels, it is difficult to improve the quality of the intermediate view image.

Referring to FIG. 2, it can be seen that the disparity map contains a large amount of noise representing incorrect disparity information.

Due to such noise, the contour portion of a person is broken in the intermediate view image as shown in FIG. 3.

Figure 4B:
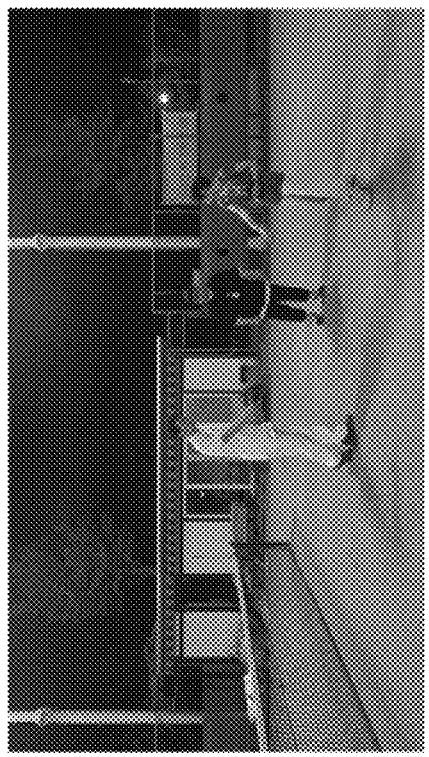
FIG. 4B is a schematic diagram illustrating a a right view image.
Figure 4A:
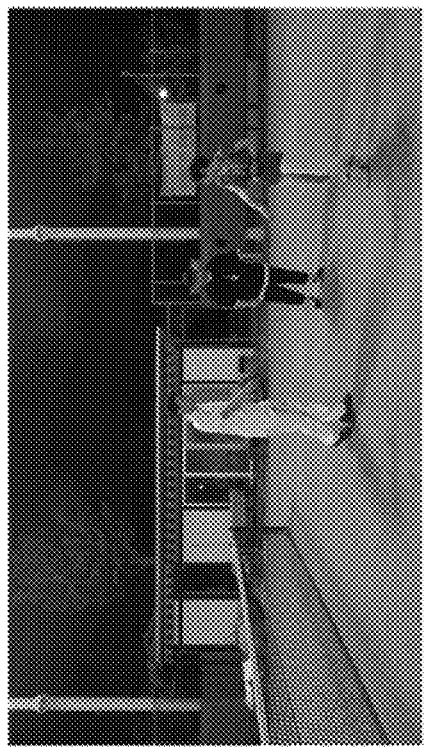
FIG. 4A is a schematic diagram illustrating a left view image.
Figure 5:
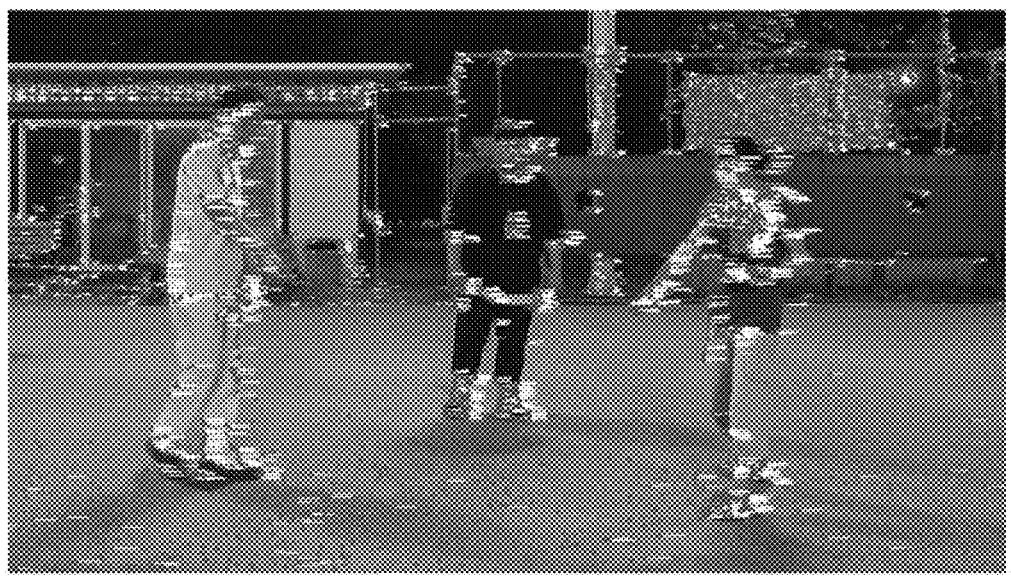
FIG. 5 is a schematic diagram illustrating disparity information.
Figure 6:
FIG. 6 is a schematic diagram illustrating the intermediate view image generated by the method for obtaining disparity information for some pixels of an image.

FIGS. 4A and 4B are schematic diagrams illustrating a left view image (4A) and a right view image (4B). FIG. 5 is a schematic diagram illustrating disparity information. FIG. 6 is a schematic diagram illustrating the intermediate view image generated by the method for obtaining disparity information for some pixels of an image.

The method for obtaining disparity information in some portion of an image is a method for finding several feature points in one of the left view image and the right view image and finding a corresponding point corresponding to each feature point in the other image, and then calculating disparity values from a distance (pixel) between the feature point and the corresponding point.

Referring to FIG. 5, the feature point may be a point that distinguishes an edge, for example, a fingertip point, and the corresponding point may a corresponding fingertip point of the other image.

As a method for finding corresponding points, there are a method consider the feature point of the other image as the corresponding point by using a feature point match technique, and a method for finding the corresponding point using an optical flow technique as shown in FIG. 5.

When length of a horizontal line connecting between the corresponding points corresponding to the feature points is long, it means that the disparity is large, and when the length is short, it means that the disparity is small.

Referring to FIG. 5, it can be seen that the disparity is large for a person close to a camera, and the disparity is small for a background distant from the camera.

Referring to FIG. 6, it can be seen that the portions where the disparity between the feature points and the corresponding points is not correct are blurred or superimposed in the intermediate view image.

Figure 7:
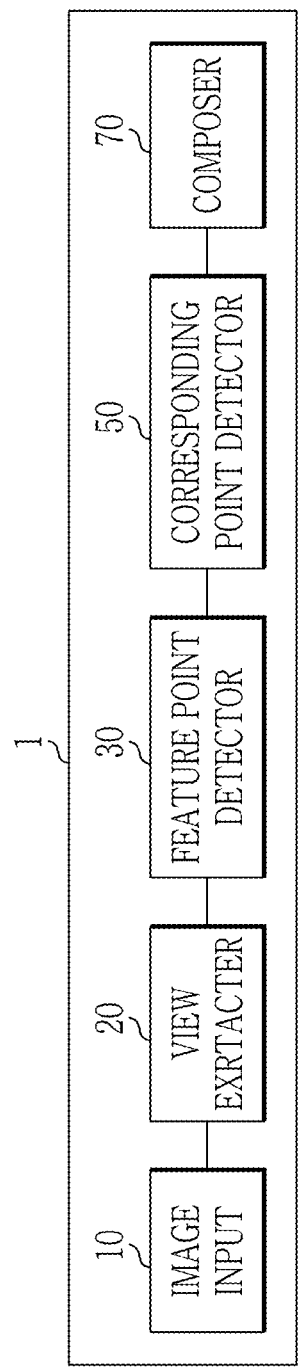
FIG. 7 is a block diagram illustrating an apparatus for generating an intermediate view image according to an exemplary embodiment.
Figure 8:
FIG. 8 is a schematic diagram illustrating a gray-scale image converted by the apparatus for generating an intermediate view image according to an exemplary embodiment.
Figure 9:
FIG. 9 is a schematic diagram illustrating feature points detected in the gray-scale image.
Figure 10:
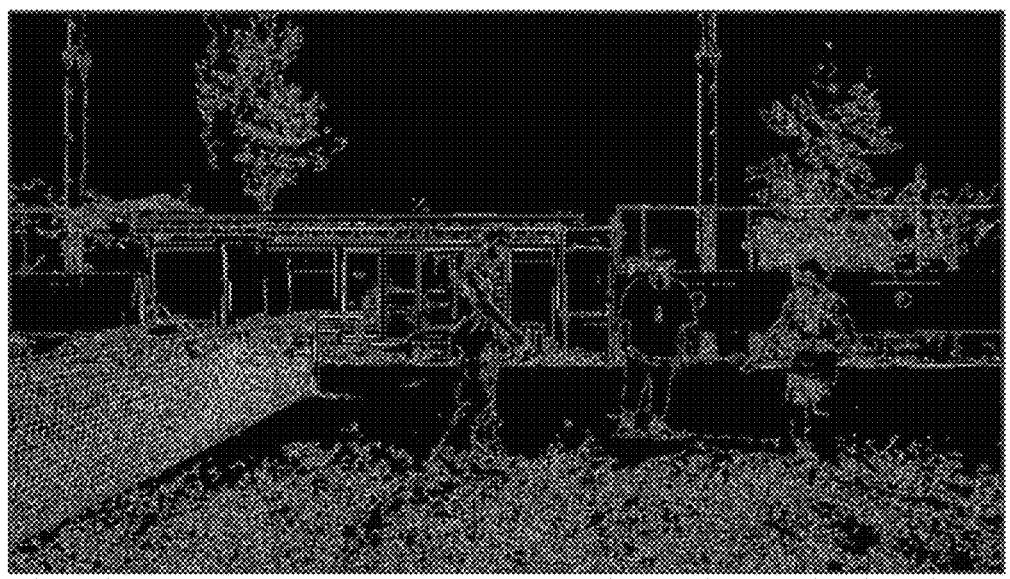
FIG. 10 is a schematic diagram illustrating contour detected by performing Canny filtering performed by the apparatus for generating an intermediate view image according to an exemplary embodiment.
Figure 11:
FIG. 11 is a schematic diagram illustrating feature points detected in the contour.
Figure 12:
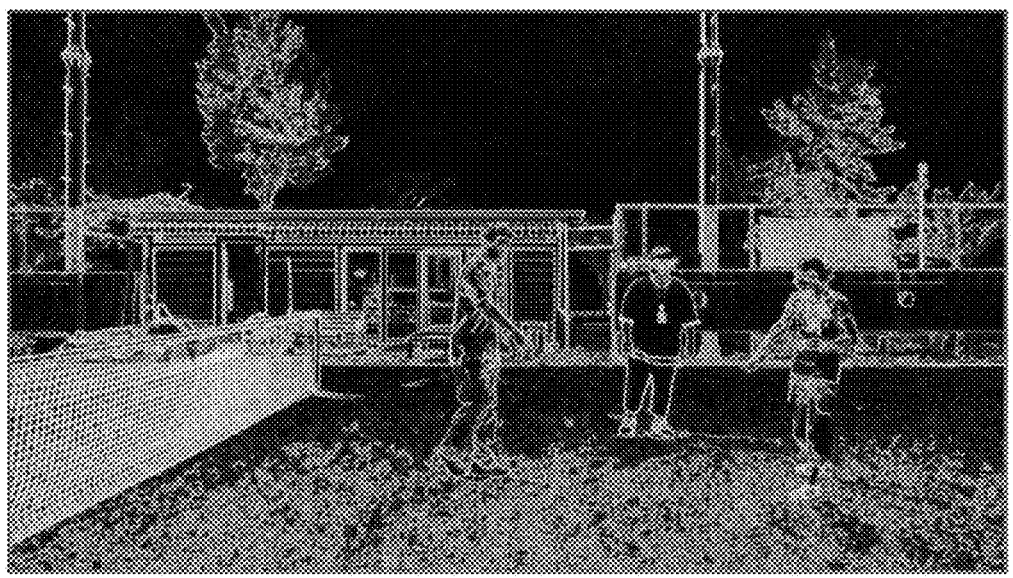
FIG. 12 is a schematic diagram illustrating a view obtained by combining an image filtered through a Sobel scheme and an image filtered through a Canny scheme.
Figure 13:
FIG. 13 is a schematic diagram illustrating feature points detected in the image filtered through the Canny scheme.

FIG. 7 is a block diagram illustrating an apparatus for generating an intermediate view image according to an exemplary embodiment. FIG. 8 is a schematic diagram illustrating a gray-scale image converted by the apparatus for generating an intermediate view image according to an exemplary embodiment. FIG. 9 is a schematic diagram illustrating feature points detected in the gray-scale image. FIG. 10 is a schematic diagram illustrating a contour detected by performing Canny filtering performed by the apparatus for generating an intermediate view image according to an exemplary embodiment. FIG. 11 is a schematic diagram illustrating feature points detected in the contour. FIG. 12 is a schematic diagram illustrating a view obtained by combining an image filtered through a Sobel scheme and an image filtered through a Canny scheme. FIG. 13 is a schematic diagram illustrating feature points detected in the image filtered through the Canny scheme.

Referring to FIG. 7, the apparatus 1 for generating an intermediate view image according to an exemplary embodiment includes a feature point detector 30, a corresponding point detector 50, and a composer 70.

The feature point detector 30 detects contours or an important point in the left and right view images, and detects the feature points in the contours or the important point.

Not all the feature points found in the image are important.

The feature points detected in the image containing clothes or wallpaper with patterns have low importance because there is little change of disparity near the feature points.

On the other hand, the feature points found in the contour of a person have high importance because there is large change of disparity near the feature points.

The feature point detector 30 converts the left and right images into a gray-scale image and performs filtering such as Sobel filtering, Laplacian filtering, and Canny filtering, and detects the contour or the important point by combining the filtered images.

The image converted into the gray-scale image is as shown FIG. 8. When the feature points are detected in this state, it can be seen that the feature points are distributed evenly as shown in FIG. 9.

When Canny filtering is performed on the gray-scale image, an image showing only the contour is generated as shown in FIG. 10.

The feature point detector 30 may detect feature points in the detected image through filtering.

An image in which the feature points are detected is shown in FIG. 11.

The feature point detector 30 may detect the feature points in an image obtained by combining the Sobel filtered image including up to a detailed gradient and the Canny filtered image based on a contour.

The image obtained by combining the Sobel filtered image and the Canny filtered image is shown in FIG. 12.

When the Canny filtered image is used, the feature points may be detected based on the contour, but a quality problem of the contour can occur.

When the threshold is set to a low value at the time of performing the Canny filtering, the contour and the feature points may be abundantly detected.

However, there is a problem that the feature points are not detected in the actual contour but are detected in the vicinity of the contour because overlapping lines are generated around the actual contour or noise lines are generated.

The correct corresponding points are hard to detect because the disparity change of the feature points near the contour is not clear.

When the threshold is set high when performing the Canny filtering, only the contours are reliably detected, so that the feature points may be neatly detected as shown in FIG. 13.

However, as in the rectangular box portion of FIG. 13, there is a problem that the feature point is not detected at the portion where the contour is not detected.

In order to solve the above problem, the feature point detector 30 detects the feature points of important contours by approaching step by step when detecting the contour, and then detects the feature points of less important contours.

In an exemplary embodiment, the feature point detector 30 sets the threshold to a first value and a second value, performs the Canny filtering on each threshold, and synthesizes the feature point detected from the Canny filtering based on the first value and the feature point detected from the Canny filtering based on the second value.

The first value may be larger than the second value, and the first value and the second value are values that may be changed according to the setting.

In an exemplary embodiment, the feature point detector 30 may perform the Canny filtering based on setting the threshold to various values, perform the step of detecting the feature points several times, and synthesize the feature points detected through each step.

The feature point detector 30 may hold the feature points detected in a state in which the threshold is set to a high level, and selectively add the feature points detected in a state in which the threshold is set to a low level to a vicinity of the feature points detected in a state in which the threshold is set to the high level.

This makes it possible to detect feature points that are valid, high in importance, and high in quality.

Figure 14:
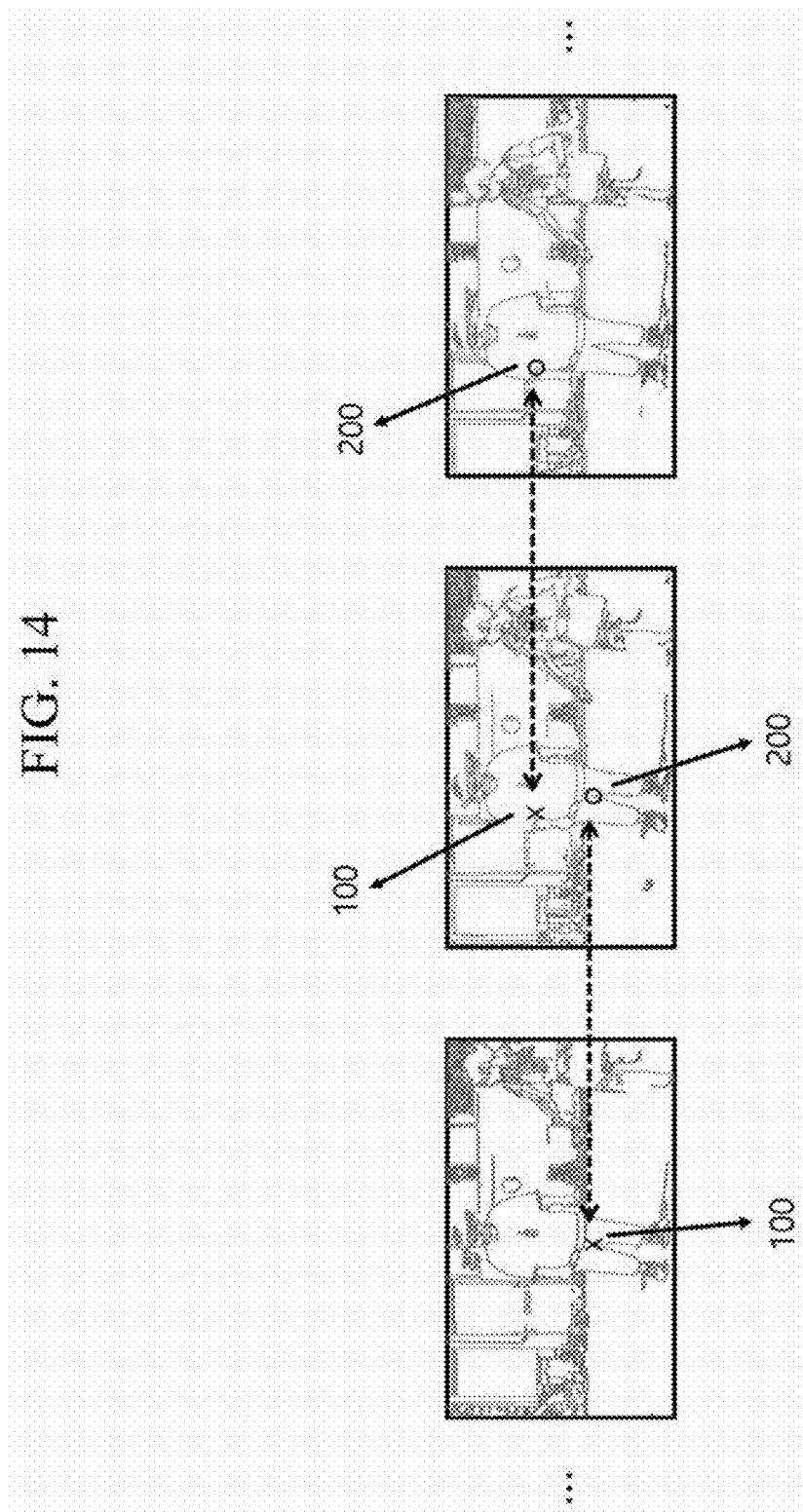
FIG. 14 and FIG. 15 are schematic diagrams illustrating corresponding points and disparity vectors detected by the apparatus for generating an intermediate view image according to an exemplary embodiment.
Figure 15:
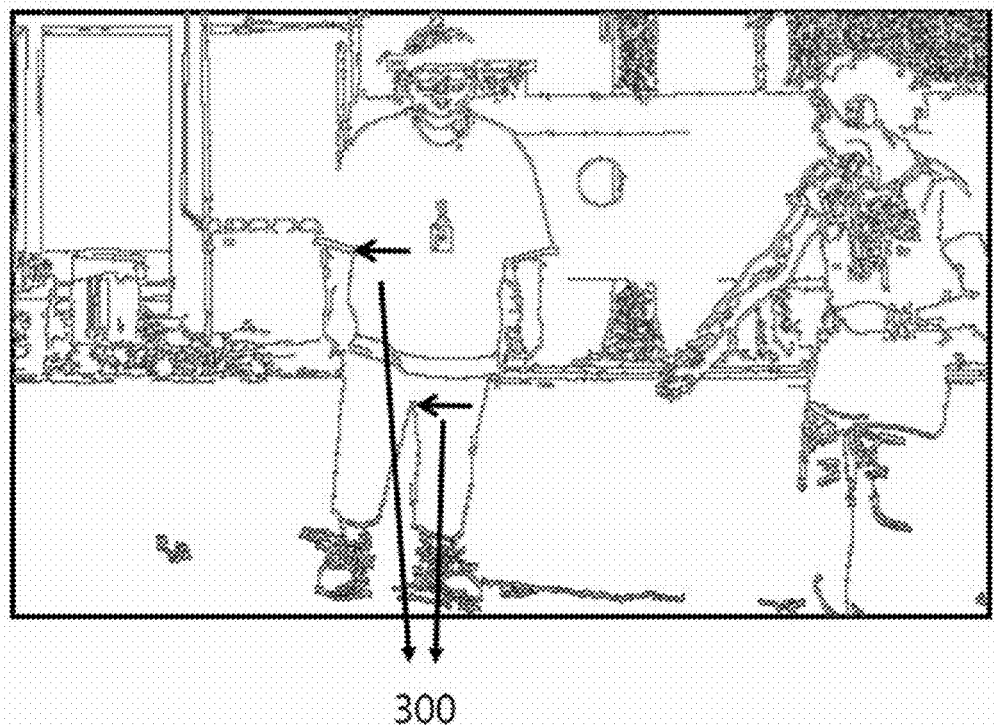
Figure 20:
FIG. 20 and FIG. 21 are schematic diagrams illustrating feature points detected by separating a background or a foreground.
Figure 21:
Figure 22:
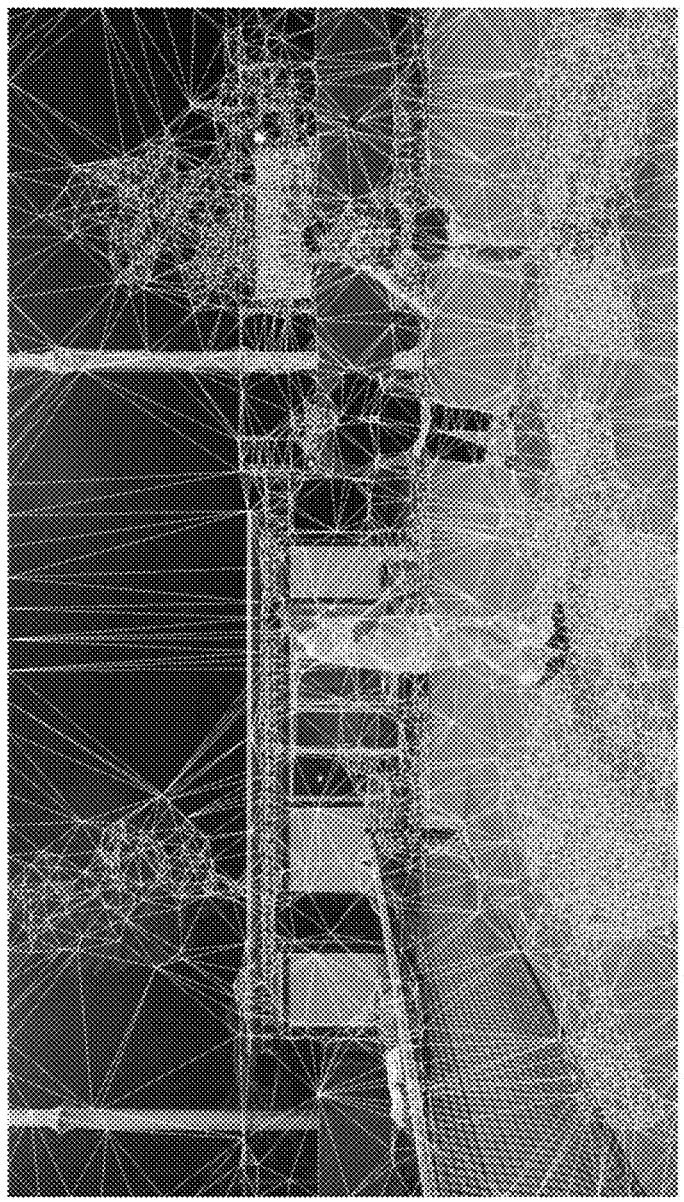
FIG. 22 is a schematic diagram illustrating an intermediate view image generated through morphing.

FIG. 14 and FIG. 15 are schematic diagrams illustrating corresponding points and disparity vectors detected by the apparatus for generating an intermediate view image according to an exemplary embodiment. FIG. 16 to FIG. 19 are schematic diagrams illustrating abnormal corresponding points. FIG. 20 and FIG. 21 are schematic diagrams illustrating feature points detected by separating a background or a foreground. FIG. 22 is a schematic diagram illustrating an intermediate view image generated through morphing.

The corresponding point detector 50 detects corresponding points corresponding to the feature points of the left and right view images.

The corresponding point detector 50 detects corresponding points corresponding to the valid feature points detected through the feature point detector 30.

The corresponding points may be detected by a method of calculating an optical flow in an image.

In this method, it is calculated that the feature point of one of the left view image and the right view image is moved to which a position of the other. The moved point becomes the corresponding point.

Referring to FIG. 14 and FIG. 15, the movement change from the feature point 100 to the corresponding point 200 may be represented by a disparity vector 300.

The corresponding points corresponding to the feature points obtained in the left view image may be detected in the right view image, and the corresponding points corresponding to the feature points obtained in the right view image may be detected in the left view image.

By summing the disparity information between the feature points and the corresponding points detected respectively in the left and right images, the disparity information may be abundant.

Generally, the corresponding points for most feature points may be obtained accurately by calculating the optical flow, but there may be a problem that abnormal corresponding points are detected for some feature points.

Figure 16:
FIG. 16 to FIG. 19 are schematic diagrams illustrating abnormal corresponding points.

Referring to the rectangular box in FIG. 16, it can be seen that the corresponding points corresponding to single feature points are generated at an incorrect position.

Figure 17:

Referring to the rectangular box in FIG. 17, it can be confirmed that an abnormal corresponding point group is detected as a whole for the feature point group of a partial region.

In FIG. 16, the corresponding points of the trees are relatively accurately detected, but in FIG. 17, it can be seen that some corresponding points of the trees are abnormally detected.

In FIG. 17, the above problem occurs mostly in the background near contours of an object with large disparity.

The problem that the corresponding points corresponding to single feature points occur at incorrect positions may be visually confirmed and removed when a distance between the corresponding points generated at an incorrect position and the feature points such as the rectangular box in FIG. 16 is long. However, it is difficult to visually confirm and remove them when the distance is short.

Figure 18:

If all of the corresponding points over a certain distance are removed, the corresponding points corresponding to the feature points lying on contours of a person close to a camera as shown in FIG. 18 may be removed due to the long distance.

If the distance condition is relaxed, the abnormal corresponding points may not be removed.

In order to solve the problem that the corresponding points corresponding to single feature points occur at an incorrect position, the corresponding point detector 50 detects reversed corresponding points corresponding to the detected corresponding points, selects valid corresponding points by removing the abnormal corresponding points among the corresponding points detected based on positions between the reversed corresponding points and the feature points detected through the feature point detector 30. The composer 70 generates the intermediate view image using the disparity information between the valid corresponding points and the valid feature points detected through the feature point detector 30.

Specifically, referring to in FIG. 14 and FIG. 15, the corresponding point detector 50 regards all the corresponding points 200 detected as the feature points 100 and detects the reversed corresponding points 300 of an opposite image, and then compares the position of an original feature point 100 with the position of the reversed corresponding points 300.

If the corresponding points are correctly detected, the reversed corresponding points are also accurately detected, so that there is no difference between the position of the feature points and the position of the reversed corresponding points.

The corresponding point detector 50 determines that the detected corresponding points are abnormal if the positions between the reversed corresponding points and the feature points detected through the feature point detector 30 are different, and removes the corresponding points that are determined to be abnormal.

Figure 19:

As a result, the abnormal corresponding points are effectively removed as shown in FIG. 19.

In order to solve the problem that abnormal corresponding points are detected for some feature points, the corresponding point detector 50 separates feature points included in the background and the foreground among the feature points of the left view image and the right view image, and detects corresponding points corresponding to feature points included in the background and corresponding points corresponding to feature points included in the foreground, and combines the detected corresponding points.

Specifically, the corresponding point detector 50 separates the feature points corresponding to the background and the foreground in the left view image and the right view image.

The foreground may mean a main object such as a person.

The corresponding point detector 50 detects respective corresponding points corresponding to feature points for the background and the foreground, and combines the detected corresponding points.

In order to enhance the quality of the corresponding points, the corresponding point detector 50 separates the feature points for the background and the foreground among the feature points of the left view image and the right view image, and then detects respective reversed corresponding points for the corresponding points included in the background and the foreground.

The corresponding point detector 50 determines whether the corresponding points included in the background and the foreground are normal by comparing the position of each of the reversed corresponding points with the position of each of the feature points included in the background and the foreground, determines that the corresponding points are abnormal if the positions between the reversed corresponding points and the feature points included in the background and the foreground are different, and removes the abnormal corresponding points.

The corresponding point detector 50 removes the abnormal corresponding points in the background and the foreground, and then synthesizes remaining corresponding points included in the background and the foreground.

The composer 70 generates the intermediate view image using the disparity information between the valid feature points detected through the feature point detector 30 and the valid corresponding points detected through the corresponding point detector 50.

The composer 70 generates the intermediate view image by performing morphing or warping using the disparity information.

Referring to FIG. 22, the composer 70 generates the intermediate view image by morphing triangular patches obtained from the detected feature points and triangular patches obtained from the corresponding points.

Figure 23:
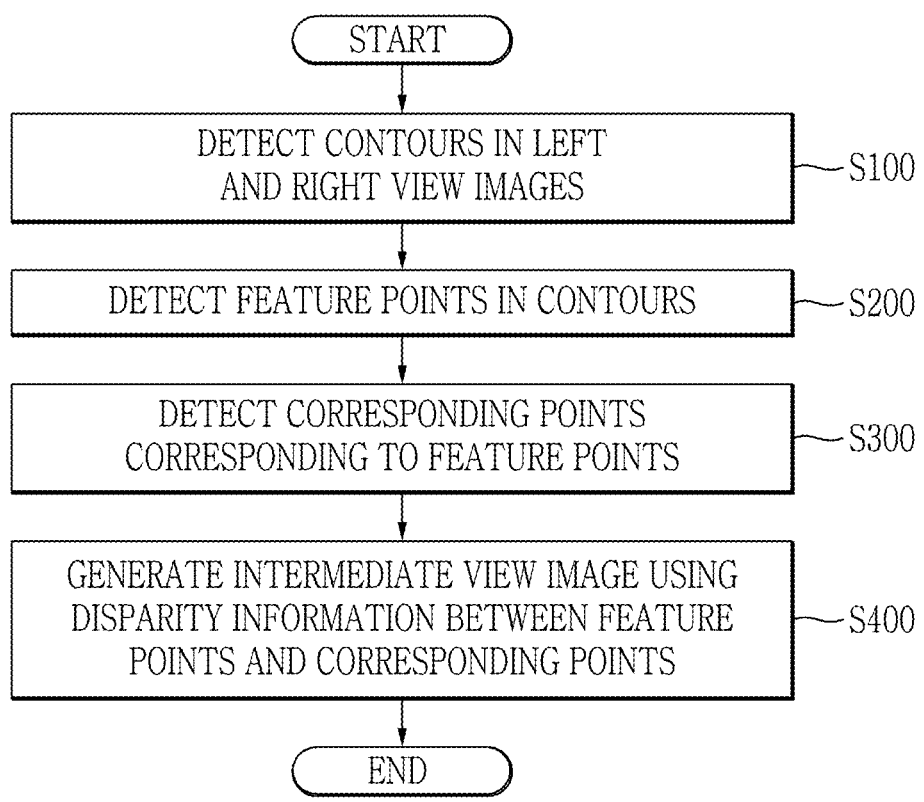
FIG. 23 and FIG. 24 are flowcharts illustrating a method for generating an intermediate view image according to an exemplary embodiment.

FIG. 23 is a flowchart illustrating a method for generating an intermediate view image according to an exemplary embodiment.

Referring to FIG. 23, the method for generating an intermediate view image according to an exemplary embodiment includes detecting, by the feature point detector 30, contours in left and right view images, detecting, by the feature point detector 30, feature points in the contours, detecting, by the corresponding point detector 50, corresponding points corresponding to the feature points, and generating, by the composer 70, an intermediate view image based on disparity information between the feature points and the corresponding points.

Figure 24:
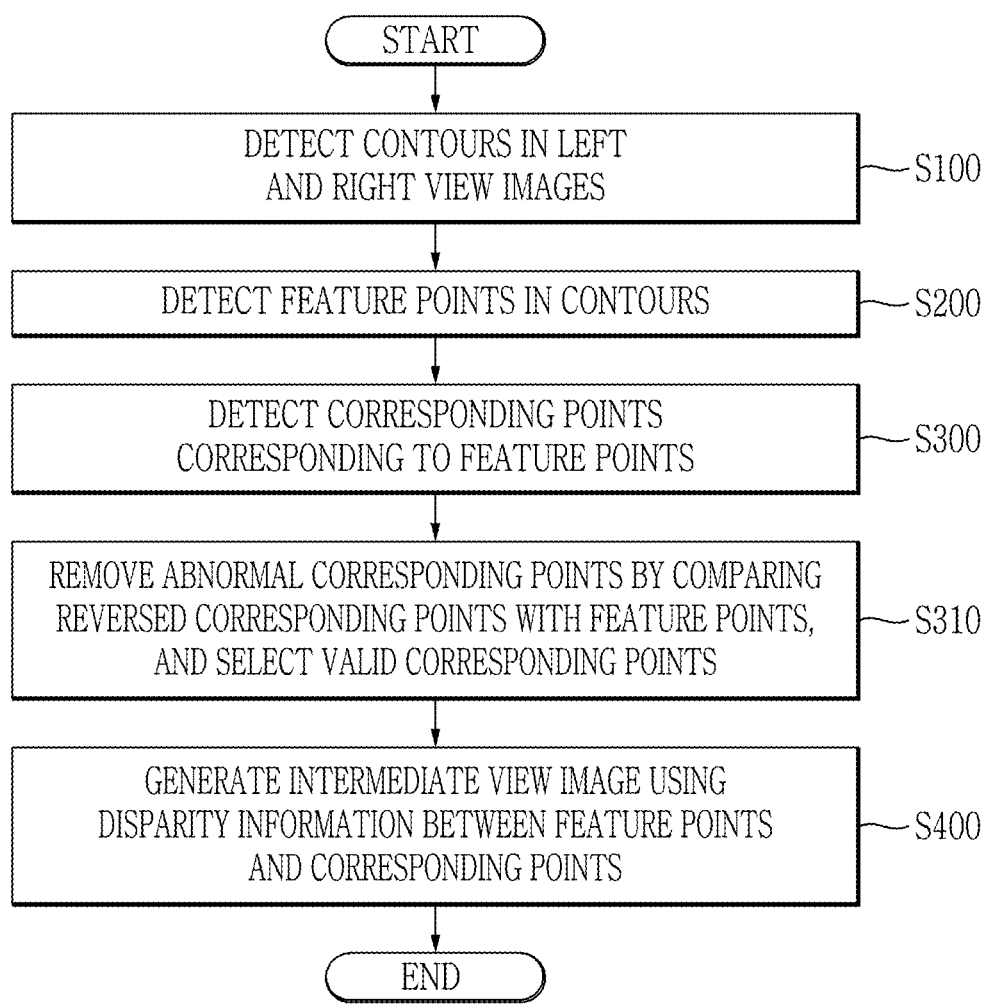

FIG. 24 is a flowchart illustrating a method for generating an intermediate view image according to an exemplary embodiment.

Referring to FIG. 24, the method for generating an intermediate view image according to an exemplary embodiment may further include, after generating, detecting reversed corresponding points corresponding to the corresponding points, and selecting valid corresponding points by removing the abnormal corresponding points among the corresponding points based on positions between the reversed corresponding points and the feature points.

The generating generates the intermediate view image using the disparity information between the valid corresponding points and the detected feature points.

The selecting determines that the detected corresponding points are abnormal if the positions between the reversed corresponding points and the feature points are different, and removes the corresponding points that are determined to be abnormal.

Figure 25:
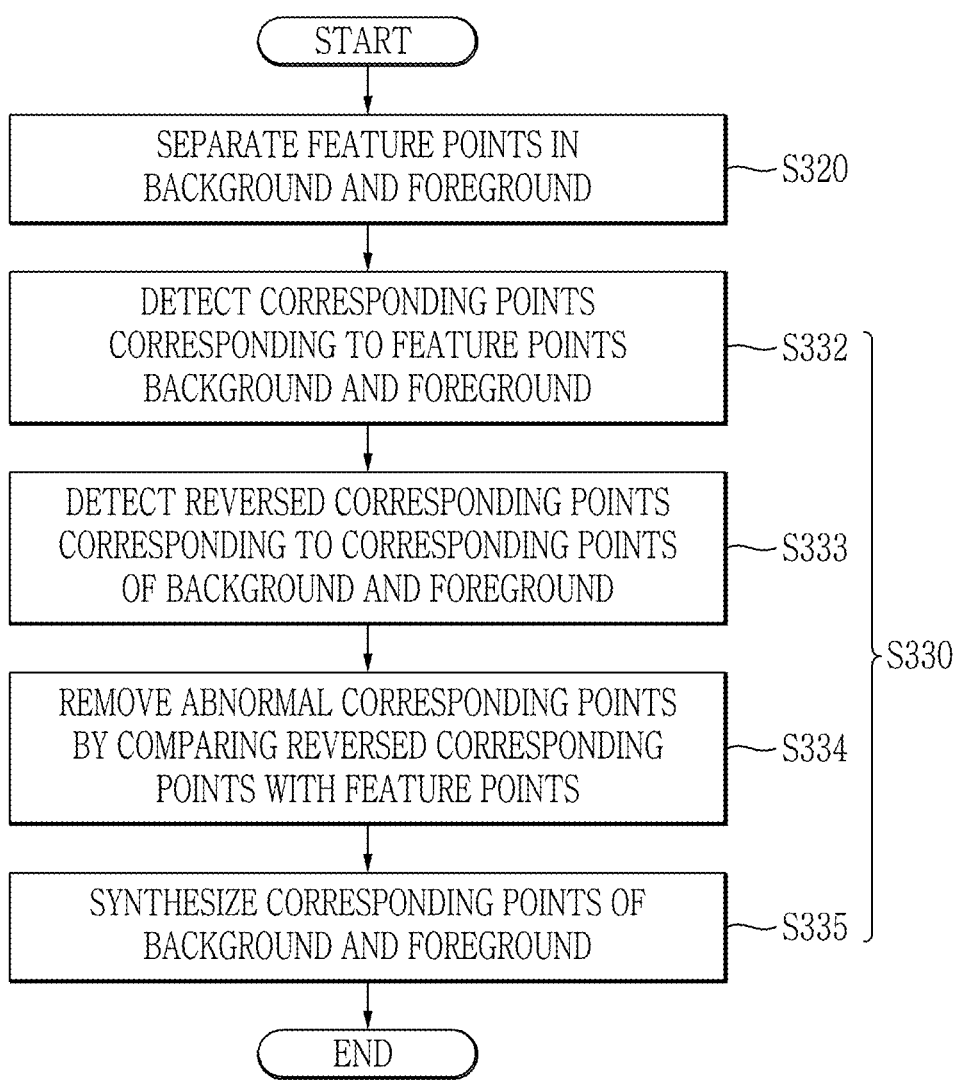
FIG. 25 is a flowchart illustrating detecting corresponding points according to an exemplary embodiment.

FIG. 25 is a flow chart illustrating detecting corresponding points according to an exemplary embodiment.

Referring to FIG. 25, detecting corresponding points may include separating the feature points included in a background and a foreground among the feature points of the left view image and the right view image, detecting corresponding points corresponding to the feature points included in the background and corresponding points corresponding to the feature points included in the foreground, and combining the detected corresponding points.

The combining may include detecting the corresponding points corresponding to feature points included in the background and the corresponding points corresponding to feature points included in the foreground, detecting respective reversed corresponding points for the corresponding points included in the background and the foreground, determining that the corresponding points are abnormal if the positions between the reversed corresponding points and the feature points included in the background and the foreground are different, removing abnormal corresponding points, and synthesizing remaining corresponding points included in the background and the foreground.

The generating may generate the intermediate view image by performing morphing or warping using the disparity information.

Detecting the contours, detecting the feature points, detecting corresponding points, and generating the intermediate view image are the same as the operating of the feature point detector 30, the corresponding point detector 50, and the composer 70 described above, and a detailed description thereof will be omitted.

Figure 26:
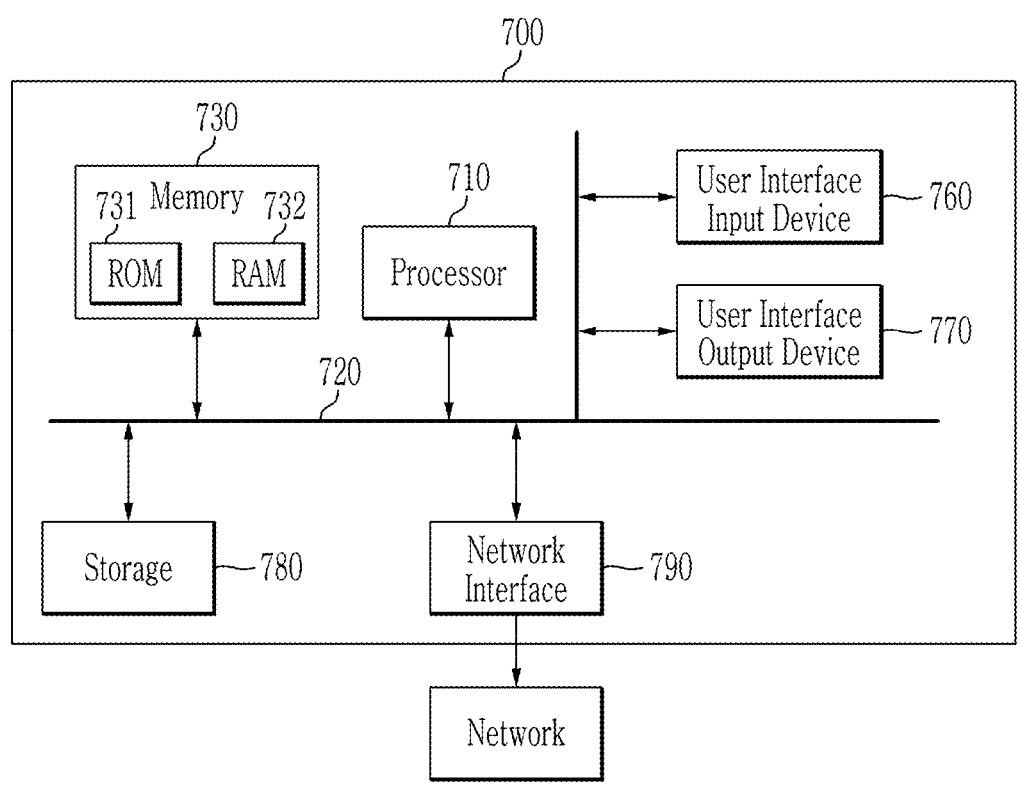
FIG. 26 is a block diagram illustrating an apparatus for generating an intermediate view image according to another exemplary embodiment.

FIG. 26 is a block diagram illustrating an apparatus for generating an intermediate view image according to another exemplary embodiment.

Referring to FIG. 26, an embodiment of the present invention may be implemented in a computer system, e.g., as a computer readable medium.

As shown in in FIG. 26, a computer system 700 may include one or more of a processor 710, a memory 730, a user input device 760, a user output device 770, and a storage 780, each of which communicates through a bus 720. The computer system 700 may also include a network interface 790 that is coupled to a network. The processor 710 may be a central processing unit (CPU) or a semiconductor device that executes processing instructions stored in the memory 730 and/or the storage 780. The memory 730 and the storage 780 may include various forms of volatile or non-volatile storage media. For example, the memory may include a read-only memory (ROM) 731 and a random access memory (RAM) 732.

Accordingly, an embodiment of the invention may be implemented as a computer implemented method or as a non-transitory computer readable medium with computer executable instructions stored thereon. In an embodiment, when executed by the processor, the computer readable instructions may perform a method according to at least one aspect of the invention.

An apparatus for generating intermediate view image according to an exemplary embodiment includes the processor 710 and the memory 730, the processor 710 executes a program stored in the memory 730, may perform detecting contours in left and right view images, detecting feature points in the contours, detecting corresponding points corresponding to the feature points, and generating an intermediate view image based on disparity information between the feature points and the corresponding points.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for generating an intermediate view image of a stereoscopic image, comprising:
    a feature point detector configured to detect contours in left and right view images, and to detect feature points in the contours;
    a corresponding point detector configured to detect corresponding points corresponding to the feature points of a left view image in a right view image, and detect corresponding points corresponding to the feature points of the right view image in the left view image; and
    a composer configured to generate an intermediate view image based on disparity information between the feature points and the corresponding points detected respectively in the left and right images;
    wherein
    the corresponding point detector is further configured to detect reversed corresponding points corresponding to the corresponding points of the right view image in the left view image, detect reversed corresponding points corresponding to the corresponding points of the left view image in the right view image, and select valid corresponding points by removing abnormal corresponding points among the corresponding points based on positions between the reversed corresponding points and the feature points in the left and right view image, respectively, and
    the composer is configured to generate the intermediate view image using the disparity information between the valid corresponding points and the feature points.

2. The apparatus of claim 1, wherein
    when a position between a feature point of one view image among the left and right view image and a reversed corresponding point in the one view image with respect to a corresponding point in another view image corresponding to the feature point of the one view image is different, the corresponding point detector is further configured to determine that the corresponding point in the other view image is abnormal and remove the corresponding point that is determined to be abnormal.

3. The apparatus of claim 1, wherein
    the corresponding point detector is further configured to separate feature points included in a background and a foreground among the feature points of the left view image and the right view image, detect corresponding points corresponding to the feature points included in the background and corresponding points corresponding to the feature points included in the foreground in the left and right view image, respectively, and synthesize the detected corresponding points in the left and right view image, respectively.

4. A method for generating an intermediate view image of a stereoscopic image, comprising:
    detecting contours in left and right view images;
    detecting feature points in the contours;
    detecting corresponding points corresponding to the feature points of a left view image in a right view image, and detect corresponding points corresponding to the feature points of the right view image in the left view image;
    detecting reversed corresponding points corresponding to the corresponding points of the right view image in the left view image and reversed corresponding points corresponding to the corresponding points of the left view image in the right view image;
    selecting valid corresponding points by removing abnormal corresponding points among the corresponding points based on positions between the reversed corresponding points and the feature points in the left and right view image, respectively; and
    generating an intermediate view image based on disparity information between the feature points and the corresponding points detected respectively in the left and right images.

5. The method of claim 4, wherein
    the selecting valid corresponding points comprises:
    when a position between a feature point of one view image among the left and right view images and a reversed corresponding point in the one view image with respect to a corresponding point in another view image corresponding to the feature point of the one view image is different, determining that the corresponding point in the other view image is abnormal; and removing the corresponding point that is determined to be abnormal.

6. The method of claim 4, wherein
the detecting corresponding points comprises:

separating feature points included in a background and a foreground among the feature points of the left view image and the right view image;

detecting corresponding points corresponding to the feature points included in the background and corresponding points corresponding to the feature points included in the foreground in the left and right view image, respectively; and synthesizing the detected corresponding points in the left and right view image, respectively.

7. An apparatus for generating an intermediate view image of a stereoscopic image, comprising
a processor and a memory,
wherein the processor executes a program stored in the memory, and performs:

detecting contours in left and right view images, and detecting feature points in the contours;

detecting corresponding points corresponding to the feature points of the left view image in the right view image, and detect corresponding points corresponding to the feature points of the right view images in the left view images;

detecting reversed corresponding points corresponding to the corresponding points of the right view image in the left view image and reversed corresponding points corresponding to the corresponding points of the left view image in the right view image;

selecting valid corresponding points by removing abnormal corresponding points among the corresponding points based on positions between the reversed corresponding points and the feature points in the left and right view image, respectively; and generating an intermediate view image based on disparity information between the feature points and the corresponding points detected respectively in the left and right images.

\* \* \* \* \*